United States Patent
Chen et al.

(10) Patent No.: US 10,243,707 B2
(45) Date of Patent: Mar. 26, 2019

(54) EFFICIENT DOWNLINK OPERATION FOR EIMTA

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 14/263,812

(22) Filed: Apr. 28, 2014

(65) Prior Publication Data

US 2014/0334400 A1   Nov. 13, 2014

Related U.S. Application Data

(60) Provisional application No. 61/821,882, filed on May 10, 2013.

(51) Int. Cl.
| | | |
|---|---|---|
| H04L 5/00 | (2006.01) | |
| H04W 72/00 | (2009.01) | |
| H04L 5/14 | (2006.01) | |

(52) U.S. Cl.
CPC .......... *H04L 5/0048* (2013.01); *H04L 5/1469* (2013.01); *H04W 72/005* (2013.01)

(58) Field of Classification Search
CPC ... H04W 72/005; H04W 72/02; H04W 72/12; H04L 5/0048; H04L 5/003; H04L 5/0042; H04L 5/0053; H04L 5/0066; H04L 5/007; H04L 1/00
See application file for complete search history.

(56) References Cited

U.S. PATENT DOCUMENTS

| | | | | |
|---|---|---|---|---|
| 2010/0303013 | A1* | 12/2010 | Khandekar | H04W 99/00 370/328 |
| 2012/0093051 | A1 | 4/2012 | Xu | |
| 2012/0300681 | A1* | 11/2012 | Ji | H04W 56/00 370/280 |
| 2013/0272170 | A1 | 10/2013 | Chatterjee et al. | |
| 2014/0301255 | A1* | 10/2014 | Yin | H04L 5/14 370/280 |

(Continued)

FOREIGN PATENT DOCUMENTS

| | | |
|---|---|---|
| WO | WO-2012149673 A1 | 11/2012 |
| WO | WO-2012161508 A2 | 11/2012 |
| WO | WO-2012171465 A1 | 12/2012 |

(Continued)

OTHER PUBLICATIONS

International Search Report and Written Opinion—PCT/US2014/035842—ISA/EPO—dated Dec. 23, 2014.

(Continued)

*Primary Examiner* — Ricky Q Ngo
*Assistant Examiner* — Stephen N Steiner
(74) *Attorney, Agent, or Firm* — Nerrie M. Zohn

(57) ABSTRACT

Certain aspects of the present disclosure provide techniques for wireless communications and, more particularly, to techniques that may be utilized, for example, to achieve efficient downlink (DL) operations for enhanced interference management for traffic adaptation (eIMTA) in long term evolution (LTE).

26 Claims, 13 Drawing Sheets

(56) References Cited

U.S. PATENT DOCUMENTS

2015/0117294 A1* 4/2015 Li .................... H04W 72/0446
370/312

FOREIGN PATENT DOCUMENTS

| WO | WO-2013056445 A1 | 4/2013 | |
|----|------------------|---------|---|
| WO | WO-2013166689 A1 | 11/2013 | |
| WO | WO-2013170426 A1 | 11/2013 | |
| WO | WO-2014007595 A1 | 1/2014 | |
| WO | WO 2014161174 A1 * | 10/2014 | ............ H04W 80/00 |

OTHER PUBLICATIONS

Samsung: "Signaling methods for TDD UL-DL reconfiguration," 3GPP Draft; R1-130293 Signaling Methods for TDD UL-DL Reconfiguration, 3rd Generation Partnership Project (3GPP), Mobile Competence Centre; 650, Route Des Lucioles; F-06921 Sophiaantipolis Cedex; vol. RAN WG1, No. St Julian; Jan. 28, 2013-Feb. 1, 2013 Jan. 19, 2013 (Jan. 19, 2013), pp. 1-3, XP050663639, Retrieved from the Internet: URL: http://www.3gpp.org/ftp/tsg_ran/WG1_RL1/TSGR1_72/Docs/ (retrieved on Jan. 19, 2013].

Huawei, et al., "Backward Compatibility for TDD eIMTA", 3GPP TSG-RAN WG1#72bis R1-130884, Apr. 6, 2013, 3 Pages, URL: http://www.3gpp.org/ftp/tsg_ran/WG1_RL1/TSGR1_72b/Docs/R1-130884.zip.

Samsung: "CRS Interference in UL/DL Flexible Subframes", 3GPP TSG-RAN WG1#72 R1-130289, Jan. 19, 2013, pp. 1-3, URL: http://www.3gpp.org/ftp/tsg_ran/WG1_RL1/TSGR1_72/Docs/R1-130289.zip.

Samsung: "CRS Presence in Flexible Subframes", 3GPP TSG-RAN WG1#72bis R1-131008, Apr. 5, 2013, pp. 1-4, URL: http://www.3gpp.org/ftp/tsg_ran/WG1_RL1/TSGR1_72b/Docs/R1-131008.zip.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 6

EFFICIENT DOWNLINK OPERATION FOR EIMTA

CROSS-REFERENCE TO RELATED APPLICATIONS

The present application for patent claims priority to U.S. Provisional Application No. 61/821,882, filed May 10, 2013, which is assigned to the assignee of the present application and hereby expressly incorporated by reference herein in its entirety.

BACKGROUND

Field

Certain aspects of the disclosure generally relate to wireless communications and, more particularly, to techniques for efficient downlink (DL) operations for enhanced interference management for traffic adaptation (eIMTA) in long term evolution (LTE).

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method of wireless communications by a User Equipment (UE). The method generally includes identifying, within a set of subframes, one or more fixed subframes that are dedicated for either uplink or downlink communications and one or more flexible subframes that may be dynamically managed for either uplink or downlink communications, determining a downlink transmission mode used for one of the flexible subframes used as a downlink subframe, and processing the flexible subframes used as a downlink subframe in accordance with the determined downlink transmission mode.

Certain aspects of the present disclosure provide a method of wireless communications by a User Equipment (UE). The method generally includes identifying, within a set of subframes, one or more fixed subframes that are dedicated for either uplink or downlink communications and one or more flexible subframes that may be dynamically managed for either uplink or downlink communications, determining a downlink transmission mode used for one of the flexible subframes used as a downlink subframe, and processing the flexible subframes used as a downlink subframe in accordance with the determined downlink transmission mode.

Certain aspects of the present disclosure provide a method of wireless communications by a User Equipment (UE). The method generally includes identifying, within a set of subframes, one or more fixed subframes whose directions may not be dynamically adapted and one or more flexible subframes whose directions may be dynamically adapted, determining that a structure for at least one subframe in the one or more flexible subframes is based on a Multimedia Broadcast Single Frequency Network (MBSFN) subframe, and processing at least one subframe in the one or more flexible subframes based on the determination.

Certain aspects of the present disclosure provide a method of wireless communications by a Base Station (BS). The method generally includes identifying, within a set of subframes, one or more fixed subframes that are dedicated for either uplink or downlink communications and one or more flexible subframes that may be dynamically managed for either uplink or downlink communications, transmitting a Multimedia Broadcast Single Frequency Network (MBSFN) subframe using at least one of the flexible subframes, and indicating a change to a Multicast Control Channel (MCCH) based, at least in part, on a format of the flexible subframe used as a MBSFN subframe.

Certain aspects of the present disclosure provide a method of wireless communications by a Base Station (BS). The method generally includes identifying, within a set of subframes, one or more fixed subframes that are dedicated for either uplink or downlink communications and one or more flexible subframes that may be dynamically managed for either uplink or downlink communications, determining a downlink transmission mode to be used for one of the flexible subframes used as a downlink subframe, and transmitting in the flexible subframe used as a downlink subframe in accordance with the determined downlink transmission mode.

Certain aspects of the present disclosure provide a method of wireless communications by a Base Station (BS). The method generally includes identifying, within a set of subframes, one or more fixed subframes whose directions may not be dynamically adapted and one or more flexible subframes whose directions may be dynamically adapted, determining that a structure for at least one subframe in the one or more flexible subframes is based on a Multimedia Broadcast Single Frequency Network (MBSFN) subframe, and processing the at least one subframe in the one or more flexible subframes based on the determination.

Certain aspects of the present disclosure also provide various apparatuses and program products corresponding to the methods described above.

BRIEF DESCRIPTION OF THE DRAWINGS

FIG. 6 illustrates DL and UL subframe configurations, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Network

Figure 1:
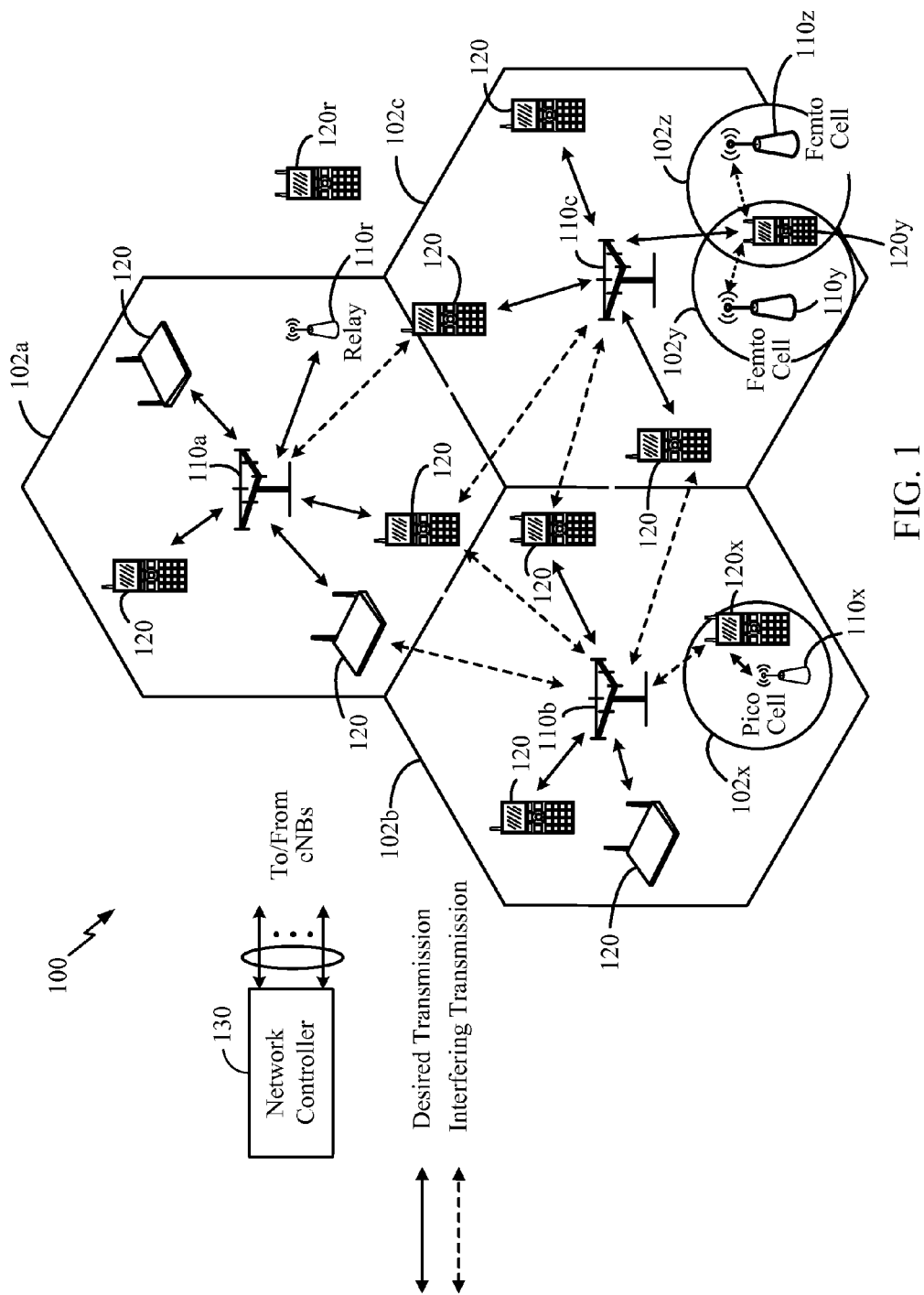
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE (e.g. UE relay station) that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 (e.g., 120x, 120y) may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop/notebook computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
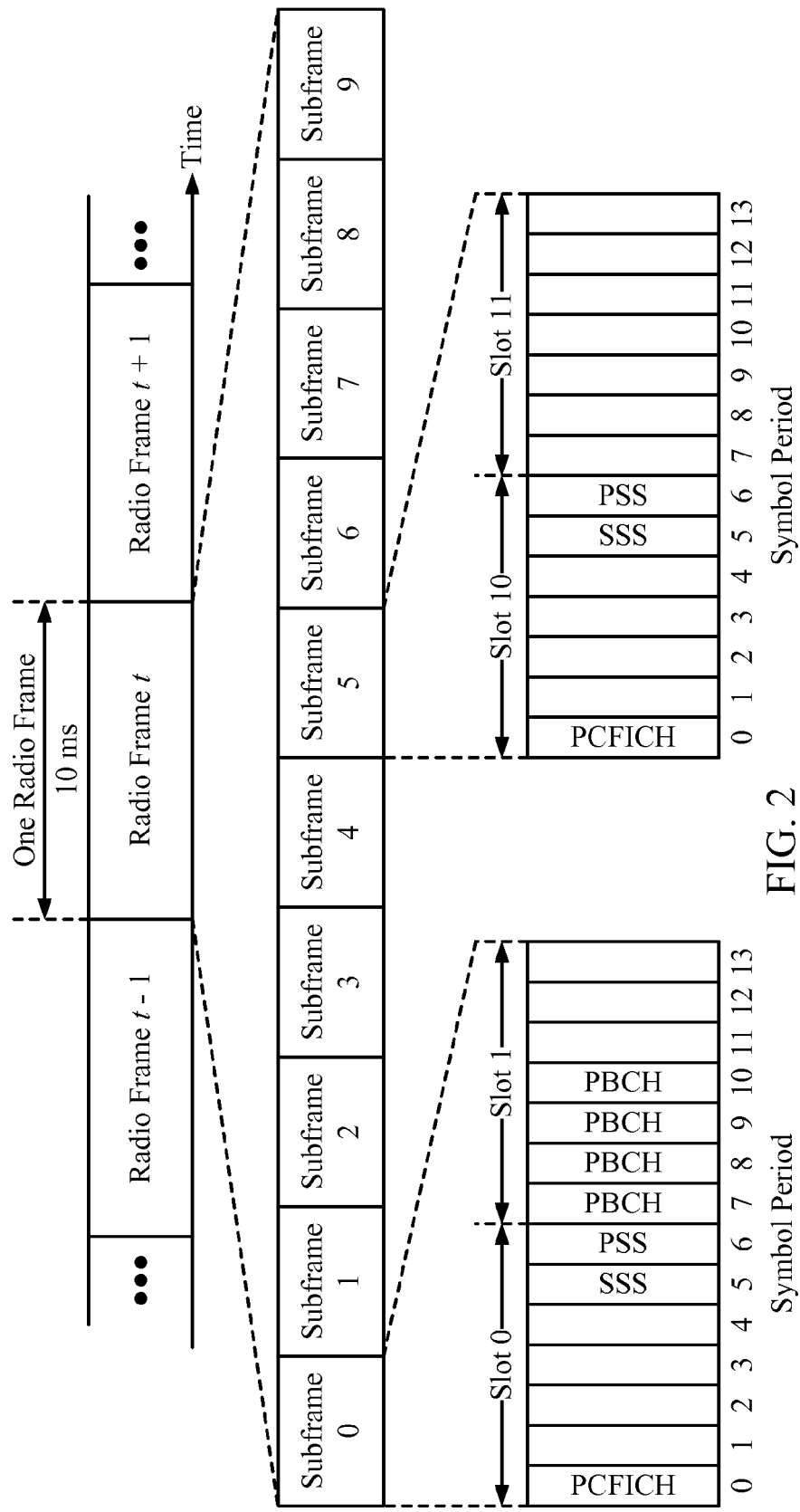
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
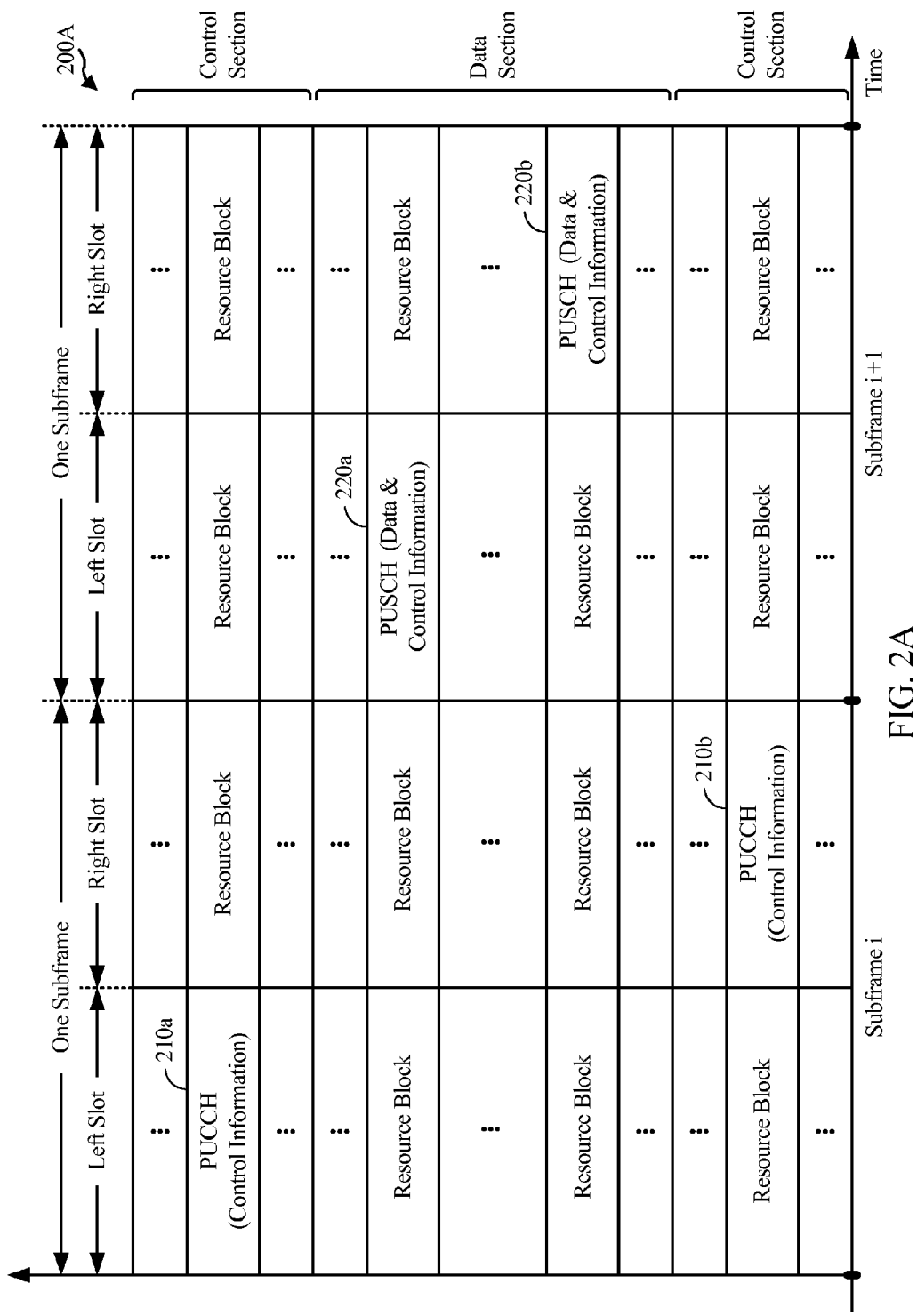
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

According to certain aspects, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
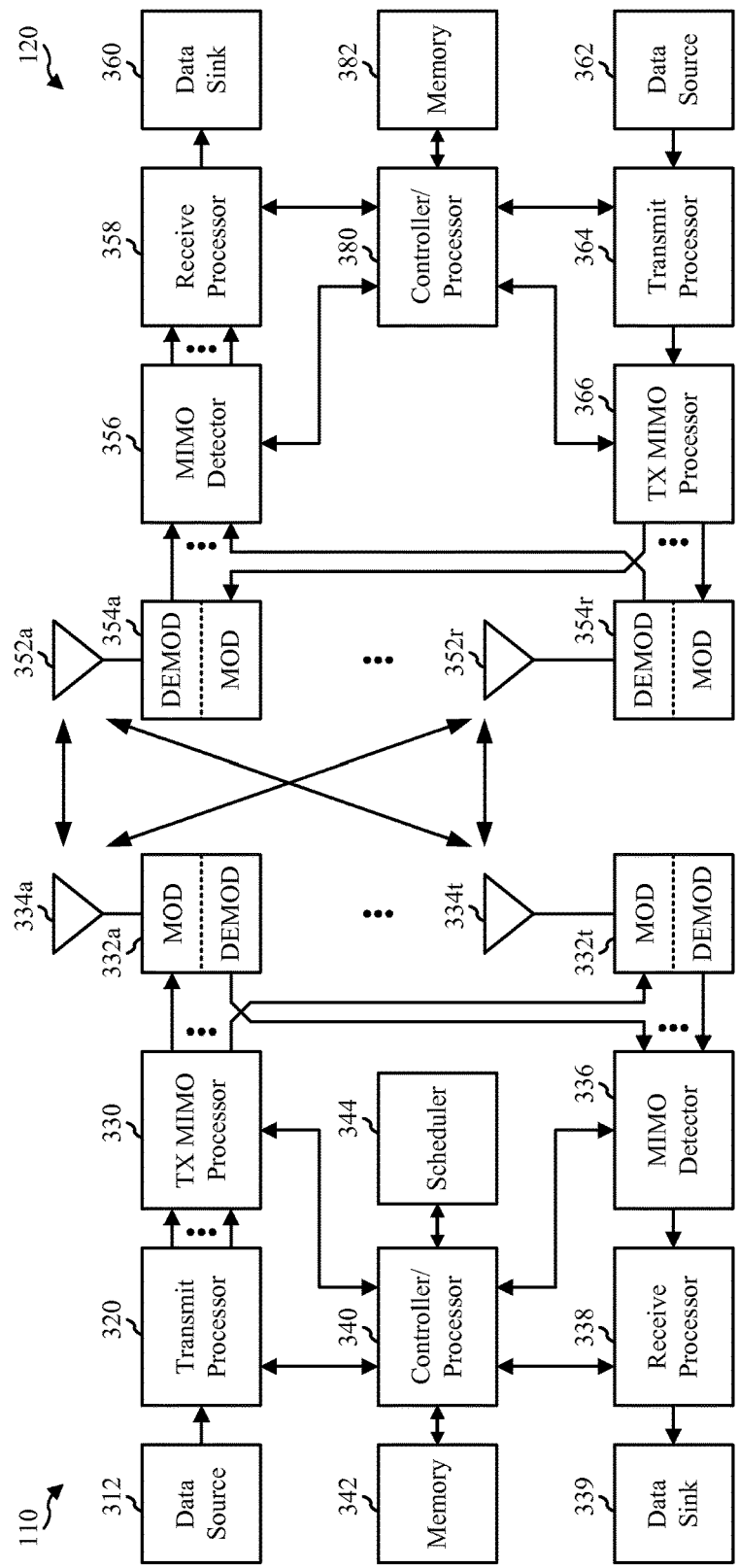
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIGS. 7, 8, 9, 10, 11, 12, and/or other processes for the techniques described herein. The memories 342 and 382 may store data and program codes for the eNB 110 and the UE 120, respectively. A scheduler 344 may schedule UEs for data transmission on the downlink and/or uplink. eNB 110 may transmit static resource partitioning information (SRPI) 390 to UE 120. UE 120 may transmit sounding reference signals (SRS) 392 to eNB 110.

Example Resource Allocation for EPDCCH

In existing wireless communications systems (e.g., so called "legacy" LTE Rel-8/9/10 systems), PDCCH is located in the first several symbols of an LTE subframe. The PDCCH is generally distributed across the entire bandwidth of the subframe and is time division multiplexed with PDSCH. In other words, the subframe is effectively divided into a control region and a data region, and the PDCCH occupies the first several symbols of the control region.

An enhanced PDCCH (EPDCCH) may be defined, for example, in non-legacy systems (e.g., Rel-12) which may complement or replace the legacy PDCCH. Unlike the legacy PDCCH, which occupies the control region of the subframe in which it is transmitted, the EPDCCH generally occupies the data region of the subframe, similar to the legacy PDSCH. In other words, an EPDCCH region may be defined that occupies the conventional/legacy PDSCH region. The EPDCCH region may consist of multiple contiguous or non-contiguous Resource Blocks (RBs) and may occupy a subset of OFDM symbols within those RBs.

Usage of EPDCCH by a network may have several advantages over usage of legacy PDCCH. For example, use of EPDCCH may, for example, increase control channel capacity, add to the capacity of the legacy PDCCH), support frequency-domain Inter-Cell Interference Cancellation (ICIC), achieve improved spatial reuse of control channel resources, support beamforming and/or diversity, operate on a New Carrier Type (NCT) (e.g., Rel-12 and later) and in Multicast-Broadcast Single Frequency Network (MBSFN) subframes, and/or coexist on a same carrier as legacy UEs.

According to certain aspects, UE-specific demodulation reference signals (DMRSs) may be used for downlink channel estimation for coherent demodulation of PDSCH and EPDCCH. For example, a UE scheduled to receive a downlink transmission in a subframe may estimate the channel conditions in the subframe based on DMRS received during the subframe, then demodulate a PDSCH or EPDCCH received in the subframe based on the received DMRS.

According to certain aspects, to provide good channel estimation for PDSCH and EPDCCH, each RB carrying a PDSCH or EPDCCH may include sufficient DMRS for good channel estimation within the RB. For example, an eNB may transmit a PDSCH to a UE in a RB and transmit DMRS on twelve resource elements within the RB. The same eNB may not transmit DMRS in a RB if it has not scheduled any downlink transmissions using that RB.

Figure 4:
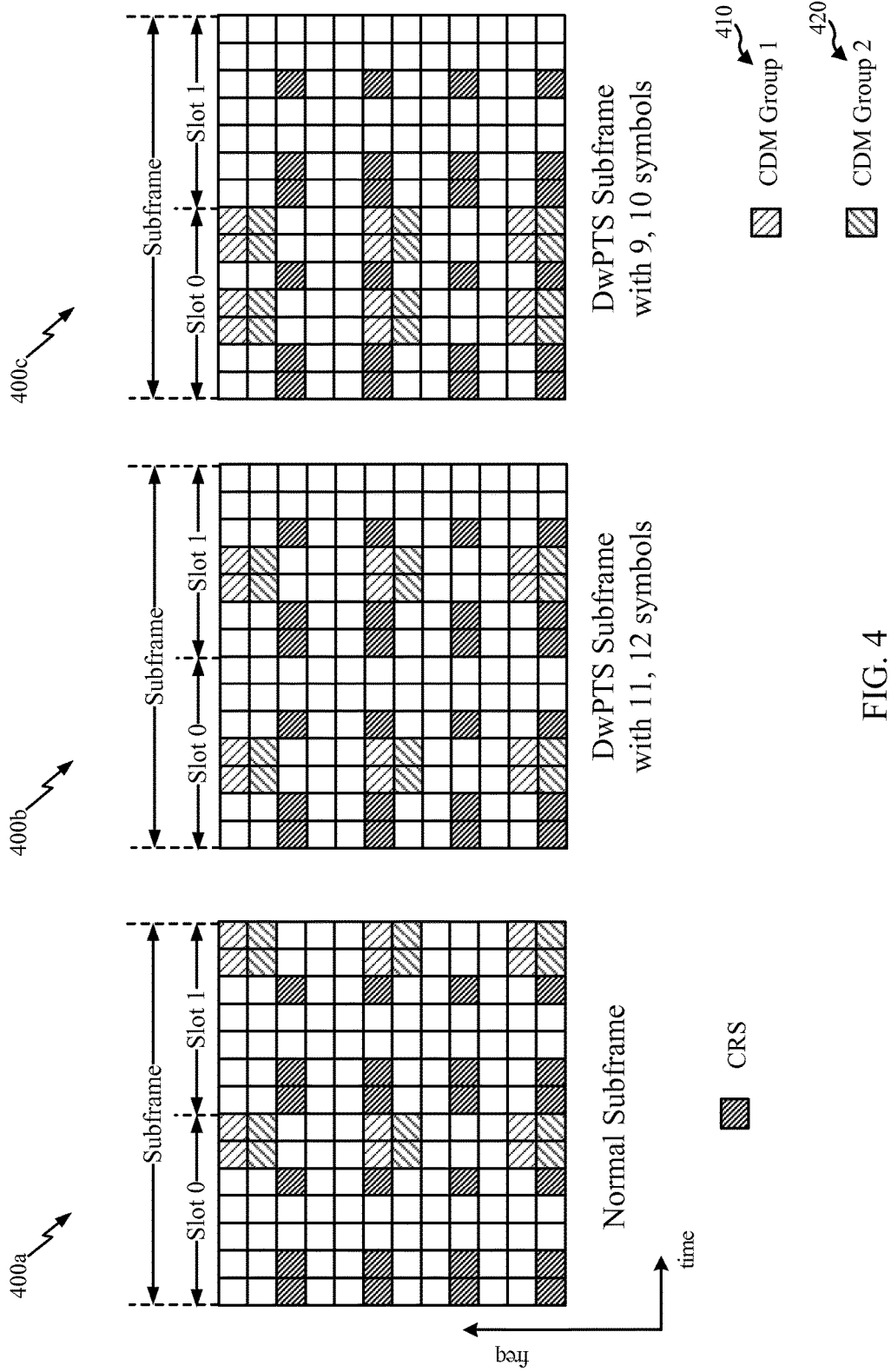
FIG. 4 illustrates DMRS patterns as defined in Rel-10 for the normal cyclic prefix case, in accordance with certain aspects of the present disclosure.

FIG. 4 illustrates example DMRS patterns 400a-c, as defined in Rel-10 for the normal cyclic prefix case, which may be used in accordance with certain aspects of the present disclosure.

As illustrated, resource elements (REs) 410 and 420 are allocated for DMRS transmissions. In the illustrated example, REs 410 are used to transmit DMRS for code division multiplexing (CDM) Group 1 and REs 420 are used to transmit DMRS for CDM Group 2. DMRS pattern 400a shows a DMRS pattern for a normal subframe. As shown in pattern 400a, the DMRSs occupy the sixth and seventh symbols of each of the first and second slots of a normal (i.e., not special) subframe. As used herein, the term normal subframe is a relative term, referring to a subframe that does not have a Downlink Pilot Time Slot (DwPTS), a special downlink timeslot that typically occurs in certain subframes (e.g., the $2^{nd}$ or $7^{th}$ subframe in a radio frame, depending on a subframe configuration) when an LTE cell is operated in a Time Division Duplex (TDD) configuration. The length of DwPTS subframes is variable, to allow for different Down-Link-UpLink switching periods to be configured DMRS pattern 400b shows an example DMRS pattern for a DwPTS subframe with 11 or 12 symbols available for downlink (i.e., the last 2 or 3 symbols are not used for downlink transmissions to allow time for UEs to switch from receiving to transmitting). As shown in this example, the DMRSs occupy the third and fourth symbols of each of the first and second slots of the subframe. DMRS pattern 400c shows a DMRS pattern for a DwPTS subframe with 9 or 10 symbols available for downlink (i.e., the last 4 or 5 symbols are not used for downlink transmissions to allow time for UEs to switch from receiving to transmitting). As shown in this example, the DMRSs occupy the third, fourth, sixth, and seventh symbols of the first slot of the subframe.

In legacy systems (e.g., Rel-8/9/10), the Primary Synchronization Signal (PSS) and the Secondary Synchronization Signal (SSS) are generally transmitted in the center six RBs of the system bandwidth in subframes 0 and 5 only (e.g., as shown in FIG. 2). The Primary Broadcast Channel (PBCH) is also generally transmitted in the center six RBs of the system bandwidth, but only in subframe 0.

Figure 5:
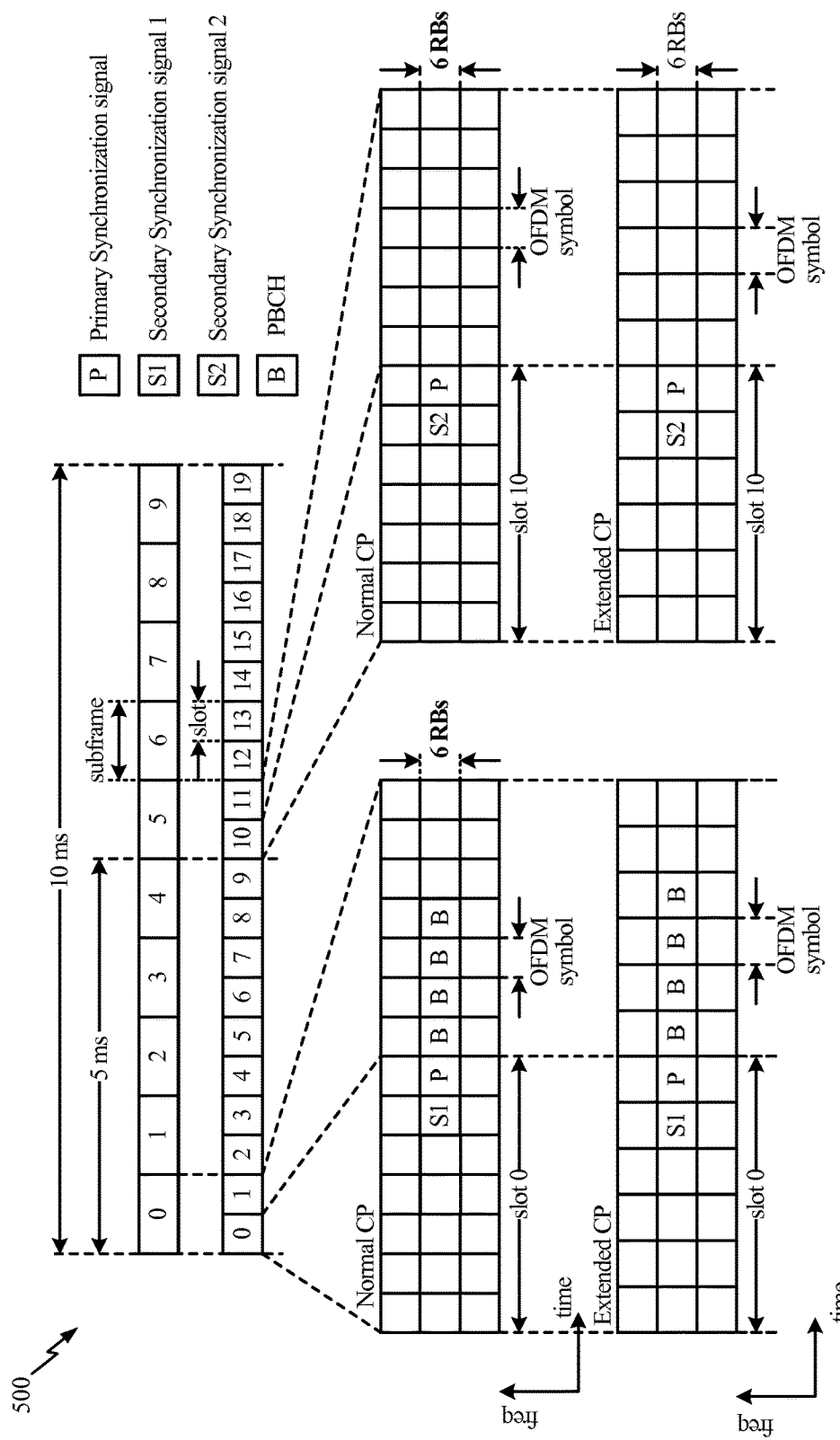
FIG. 5 illustrates resource configuration for PSS, SSS and PBCH in an LTE frame, in accordance with certain aspects of the present disclosure.

FIG. 5 illustrates an example resource configuration 500 for PSS, SSS and PBCH in an LTE frame, in accordance with certain aspects of the present disclosure. As shown in FIG. 5, an LTE frame 10 ms long is typically divided into ten subframes each 1 ms long. Each subframe may further be divided into two slots, slot 0 and slot 1. As shown, PSS and SSS are typically transmitted every 5 ms in subframes 0 and 5. The PSS and SSS are transmitted back to back in the last two symbols of the first slot in the subframes 0 and 5. Typically, SSS is transmitted before PSS.

According to certain aspects of the present disclosure, as shown in FIG. 5, in order to differentiate the 10 ms boundary, the two SSS signals, SSS1 (subframe 0) and SSS2 (subframe 5) may have different arrangements. The PSS arrangement, however, may be fixed. PBCH is transmitted every 10 ms in the first four symbols of the second slot of subframe 0. According to certain aspects, the above defined PSS/SSS/PBCH configuration is used for frequency division duplex (FDD) transmission.

According to certain aspects, for TDD operations, SSS may be transmitted in the last symbol of subframes 0 and 5, and PSS may be transmitted in the third symbol of subframes 1 and 6.

Efficient Downlink Operation for eIMTA

FIG. 6 illustrates 7 possible DL and UL subframe configurations 602 supported in LTE, when a cell is operating in a TDD configuration. Note that there are 2 switching periodicities 604 in the 7 subframe configurations, 5 ms and 10 ms. For 5 ms periodicity subframe configurations 606 (i.e. configurations 0, 1, 2, and 6), there are two special subframes 610, 612 in each frame (10 ms). For 10 ms periodicity subframe configurations 608 (i.e. configurations 3, 4, and 5), there is one special subframe 612 in each frame.

In LTE Rel-12, it is possible to dynamically adapt TDD DL/UL subframe configurations based on the actual traffic needs. This is known as evolved interference management for traffic adaptation (eIMTA). For example, if during a short duration a large data burst on downlink is needed, the configuration of a cell may be changed from, e.g., configuration #1 (6 DL subframes and 4 UL subframes) to configuration #5 (9 DL subframes and 1 UL subframe).

The adaptation of TDD configuration is expected to be no slower than 640 ms. In the extreme case, the adaptation may be as fast as 10 ms. For example, a cell may be operating in configuration #1 (6 DL subframes and 4 UL subframes), determine that the cell needs to transmit a significant quantity of data in the next frame (i.e., 10 ms later), switch to configuration #5 (9 DL subframes and 1 UL subframe), transmit the quantity of data to served UEs, determine that the cell needs to receive a significant quantity of data in the next frame (i.e., 10 ms later), and switch to configuration #0 (4 DL subframes and 6 UL subframes) after using configuration #5 for only 10 ms. The adaptation, however, may cause overwhelming interference to both downlink and uplink when two or more cells have different downlink and uplink subframes. For example, a first UE operating in a first cell using TDD configuration 1 may have difficulty receiving a DL transmission from the first cell in subframe 9 if the first UE is near a second UE operating in a second cell using TDD configuration 0, due to interference from the UL transmission from the second UE in the second cell. In the example, the second cell using TDD configuration 0 may have difficulty receiving the UL transmission from the second UE, due to interference from the DL transmission from the first cell.

The adaptation causes some complexity in DL and UL HARQ timing management. Each of the seven DL/UL subframe configurations has its own DL/UL HARQ timing. The DL/UL HARQ timing is optimized for each configuration (in terms of HARQ operation efficiency), i.e., the timing from PDSCH to the corresponding ACK/NAK can be different for different TDD DL/UL subframe configurations. For example, a UE receiving a DL transmission in a cell operating in TDD configuration 5 may wait up to 9 subframes in order to acknowledge a DL transmission, while a UE receiving a DL transmission in a cell operating in TDD configuration 0 may wait 4 or 6 subframes before acknowledging a DL transmission. Dynamic switching among the 7 configurations (or even more, if more flexible adaptation is deemed as necessary) implies that if current DL/UL HARQ timing is kept, there would be missed ACK/NAK transmission opportunities for some of the DL or UL transmissions. For example, a UE may receive a DL transmission in subframe 9 of a cell operating in TDD configuration 1 and schedule an ACK for transmission in subframe 3 of the following frame. In the example, if the cell switches to TDD configuration 2 in the following frame, the UE will be unable to transmit the ACK in subframe 3 because subframe 3 is a DL subframe in TDD configuration 2.

According to certain aspects, in eIMTA, subframes can be generally categorized as "fixed" subframes and "flexible" subframes. Fixed subframes are not expected to change in a dynamic or semi-static manner, but only when a cell determines to change from one of the 7 subframe configurations to another of the 7 subframe configurations in a static manner. Flexible subframes may change in a dynamic manner. As an example, the direction of a flexible subframe may change due to scheduler decisions based on traffic needs. As another example, the direction of a flexible subframe may change due to inter-cell and/or intra-cell interference considerations.

According to certain aspects, different cells may also share a common set of fixed subframes such that there is generally no DL to UL interference or UL to DL interference in the fixed subframes. Flexible subframes, on the other hand, may be subject to interference (DL to UL, or UL to DL).

According to certain aspects, the designation of a fixed subframe vs. a flexible subframe may be indicated to a UE via signaling or it may be predefined. For example, if in SIB1, the broadcast configuration is DSUUUDSUUU (i.e., TDD configuration 0), fixed subframes may be subframes 0, 1, 2, 5, 6, and 7, while flexible subframes may be 3, 4, 8, and 9.

According to certain aspects, a Rel-12 UE may be explicitly indicated a set of fixed subframes via dedicated signaling or broadcast signaling. For example, a Rel-12 UE operating in a TDD cell may receive RRC signaling indicating that subframes 0, 1, 2, 5, 6, and 7 are fixed subframes, and subframes 3, 4, 8, and 9 are flexible subframes.

According to certain aspects, in fixed subframes, when the cell is of legacy carrier type (LCT) or backward compatible carrier type, CRS are always transmitted on up to four CRS antenna ports. For example, a cell with four physical antennas using eIMTA, legacy carrier type, and normal cyclic prefix transmits CRS in symbols 0, 1, and 4 using four antenna ports in fixed subframes, but may transmit a reduced number of CRS using only a single antenna port in flexible subframes.

According to certain aspects, a cell transmitting using the new carrier type (NCT) may not transmit CRS in all subframes, and the number of CRS ports is fixed at 1. For example, a cell with four physical antennas using eIMTA, new carrier type, and normal cyclic prefix may transmit CRS in symbols 0, 1, and 4 using one antenna port in fixed subframes, and may not transmit CRS in flexible subframes.

According to certain aspects, a LCT cell may transmit flexible subframes with no CRS. This may allow more efficient DL operations, in that transmission resources that would have been used for transmitting CRS may be used to transmit data. For example, a LCT cell may transmit fixed subframes with CRS and flexible subframes in the same frame without CRS (i.e., the LCT cell refrains from transmitting CRS in the flexible subframes). In the example, the LCT cell may transmit DM-RS and/or CSI-RS in the flexible subframes.

According to certain aspects, flexible subframes in a LCT cell may not have a legacy control region. For example, a LCT cell may transmit fixed subframes with a legacy control region, and the same cell may transmit flexible subframes without a legacy control region (e.g., refraining from transmitting legacy control channels, such as PHICH, and using EPDCCH starting in any symbol for control in the flexible subframes).

According to certain aspects, flexible subframes in a LCT cell may only support DM-RS based EPDCCH and PDSCH. In flexible subframes PDSCH and EPDCCH may start from symbol 0. For example, a LCT cell may transmit PDCCH in a legacy control region and CRS based PDSCH in fixed subframes, and the LCT cell may transmit DM-RS based EPDCCH and PDSCH in flexible subframes beginning at symbol 0 of the flexible subframes. In the example, the LCT cell may refrain from transmitting legacy control channels (e.g., PHICH and PCFICH) in flexible subframes.

According to certain aspects, CSI-RS may be transmitted in the flexible subframes to allow CSI feedback corresponding to these flexible subframes. For example, a cell may transmit flexible subframes without CRS, but may determine that CSI feedback is needed in a flexible subframe and transmit CSI-RS in the flexible subframe.

According to certain aspects, when a cell is performing eIMTA, PDSCH and EPDCCH transmissions may not be allowed in some RBs in some subframes due to collision with other signals. For example, PDSCH and EPDCCH may not be allowed in the center 6 RBs of subframe 6 and in special subframes for some TDD DL/UL subframe configurations, due to the presence of PSS in the center 6 RBs.

According to certain aspects, cells scheduling multimedia broadcast multicast service (MBMS) on flexible subframes may transmit a legacy control region and/or CRS in the corresponding flexible subframes. The cells may transmit multicast control channel (MCCH) changes using DCI format 1C in PDCCH in the flexible subframes, where the PDCCH is based on CRS. For example, a cell operating using NCT and eIMTA may transmit DM-RS based EPDCCH and PDSCH starting at symbol in some flexible subframes. In the example, the cell may schedule MBMS service on some flexible subframes, and transmit CRS and a CRS based PDCCH conveying a MCCH change in the flexible subframes scheduled for MBMS service.

According to certain aspects, cells scheduling MBMS service on flexible subframes may not transmit a legacy control region and/or CRS in the subframes. The cells may use the entire subframe for MBMS services, as there is no legacy control region. In this case, the cells may transmit MCCH changes in a non-MBMS, flexible subframe or a fixed subframe. As an example, MCCH changes may be transmitted via PDCCH or EPDCCH in a fixed subframe, or via EPDCCH in a flexible, non-MBMS subframe.

According to certain aspects, cells may not configure certain types of transmission modes for a UE in any frame in which at least one flexible subframe is configured for the UE. According to certain aspects, cells may not configure any CRS-based DL transmission modes for a UE in any frame in which at least one flexible subframe is configured for the UE. For example, a cell scheduling a UE to receive PDSCHs in flexible subframe 4 and fixed subframe 5 may configure the UE with a DM-RS based type of DL transmission mode, but not with a CRS-based type of DL transmission mode. Transmission modes are described in 3GPP TS 36.213, entitled "Evolved Universal Terrestrial Radio Access Network (E-UTRAN); Physical Layer Procedures" which is publicly available.

According to certain aspects, a cell may configure for a UE a first DL transmission mode for a first subframe within fixed subframes of a frame and a second DL transmission mode, different from the first DL transmission mode, for a second subframe within flexible subframes of a frame. According to certain aspects, a cell may configure CRS-based DL transmission modes for a UE in fixed subframes and DM-RS based DL transmission modes for the same UE in flexible subframes of a frame. For example, a cell may configure the UE with DL transmission mode 4 in a fixed subframe and DL transmission mode 10 in a flexible subframe.

According to certain aspects, a cell which schedules a first type of subframe (e.g., a special subframe) and a second type of subframe (e.g., a normal subframe) as flexible subframes may transmit a legacy control region and CRS-based DL transmissions in the first type of subframe, and transmit the second type of subframe without a legacy control region and with DM-RS based DL transmissions. For example, a cell operating in TDD configuration 1 may schedule subframes 1 and 3 as flexible subframes, transmit a legacy control region and CRS-based DL transmissions in subframe 1, and transmit subframe 3 with DM-RS based DL transmissions and without a legacy control region. By so doing, the cell may prevent a collision between primary or secondary synchronization signals (PSS/SSS) and DM-RS. This may be advantageous for small bandwidth deployments (e.g., 1.4 MHz), because collisions between PSS/SSS and DM-RS may prevent any data transmission by the cell. Loss of a transmission opportunity may have a much larger system impact in a small bandwidth deployment than in deployments with larger bandwidths.

According to certain aspects, cells in small bandwidth (for example, less than 10 MHz) deployments may transmit legacy control regions and CRS-based transmissions in special subframes scheduled as flexible subframes, while cells in larger bandwidth deployments of the same system would not transmit legacy control regions and CRS-based transmissions in special subframes scheduled as flexible subframes.

According to certain aspects, cells may allow DM-RS transmissions to be punctured by PSS/SSS in special subframes scheduled as flexible subframes. For example, a cell operating in TDD configuration 1 may schedule subframe 1 as a flexible subframe including a DM-RS based DL transmission. In the example, the cell may puncture some of the DM-RS in subframe 1 with PSS or SSS.

According to certain aspects, cells may transmit CRS in only the first symbol (i.e., symbol 0) of some or all flexible subframes. Cells may also transmit legacy control signals in the first symbol of flexible subframes. For example, a cell operating with eIMTA may transmit CRS and legacy control signals in symbol 0 of flexible subframes while transmitting DM-RS based PDSCH or EPDCCH in the remaining symbols of a flexible subframe. In the example, the cell may transmit a PDCCH in a legacy control region of a fixed subframe, and CRS and CRS based PDSCH in the remaining symbols of the fixed subframe.

According to certain aspects, cells may start PDSCH and EPDCCH from the first symbol, as well as some other legacy control signals/channels in the first symbol. For example, a cell may transmit PCFICH or PHICH starting from the first symbol of a flexible subframe, and transmit PDSCH/EPDCCH rate matched around the legacy control signals/channels or punctured by the control signals/channels.

According to certain aspects, NCT-like operation in at least some flexible subframes helps reduce downlink interference to UL in neighboring cells. This is because the cell transmits fewer CRS in NCT-like operations. For example, a cell operating with eIMTA and NCT may transmit no CRS in a flexible subframe scheduled for DL operations, causing less interference to UL transmissions to adjacent cells.

According to certain aspects, a neighboring cell may rely on CRS to identify DL transmissions, in order to make better eNB-eNB interference measurements. eNBs may exchange information regarding NCT-like operation for the set of subframes in order to allow the eNBs to identify DL transmissions in flexible subframes which do not transmit as many CRS as in legacy carrier type DL transmissions. For example, an eNB may send a list of flexible subframes which the eNB is scheduling for NCT DL transmissions and a list of flexible subframes which the eNB is scheduling for LCT DL transmissions in the next frame to neighboring eNBs, and the neighboring eNBs may schedule UL transmissions during the flexible subframes scheduled for NCT DL transmissions.

According to certain aspects, a cell may transmit an indication to a UE regarding whether the flexible subframes are NCT-like or LCT-like. For example, a cell may transmit RRC signaling indicating flexible subframes 3, 4, and 8 are NCT-like, and flexible subframe 9 is LCT-like.

According to certain aspects, a UE may acquire an implicit indication of whether flexible subframes are NCT-like or LCT-like. For example, a UE may be configured to treat all flexible subframes as NCT-like for as long as eIMTA is enabled.

According to certain aspects, a UE may acquire an implicit indication of whether flexible subframes are NCT-like or LCT-like, subject to some restrictions. For example, a UE may be configured to treat special subframes when there is a collision between DM-RS and PSS/SSS as LCT-like, while treating all other flexible subframes as NCT-like for as long as eIMTA is enabled.

Figure 7:
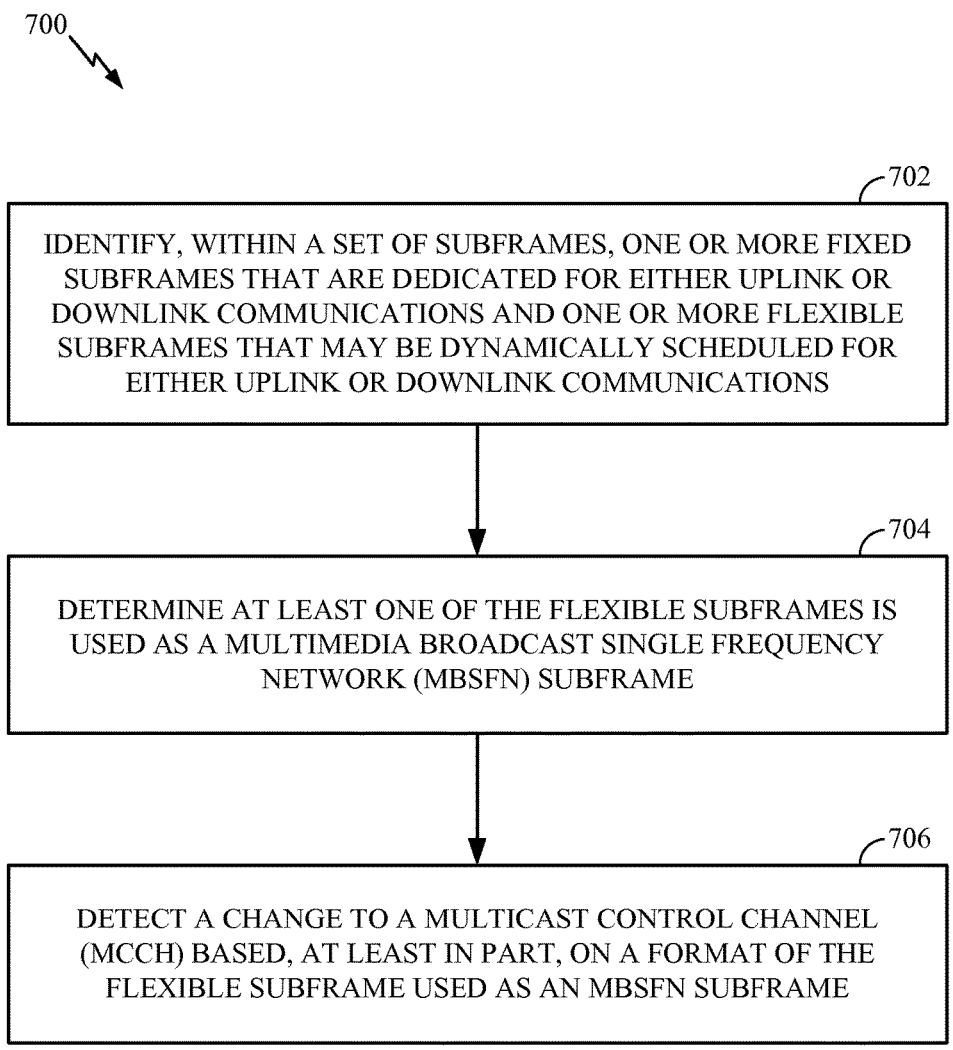
FIG. 7 illustrates example operations for wireless communications that may be performed by a User Equipment (UE), in accordance with certain aspects of the present disclosure.

FIG. 7 illustrates example operations 700 that may be performed by a User Equipment (UE) to receive MCCH changes scheduled on flexible subframes, in accordance with certain aspects of the present disclosure. Operations 700 may begin, at 702, by identifying, within a set of subframes, one or more fixed subframes that are dedicated for either uplink or downlink communications and one or more flexible subframes that may be dynamically scheduled for either uplink or downlink communications. At 704, the UE may determine at least one of the flexible subframes is used as a Multimedia Broadcast Single Frequency Network (MBSFN) subframe. At 606, the UE may detect a change to a Multicast Control Channel (MCCH) based, at least in part, on a format of the flexible subframe used as an MBSFN subframe.

According to certain aspects, a flexible subframe used as an MBSFN subframe may have a control region with cell-specific reference signals, and a UE may detect a change to an MCCH by detecting a control channel transmitted in the control region. For example, a UE may receive signaling indicating that a flexible subframe is scheduled as an MBSFN subframe, and the UE may decode a PDCCH conveying a change to an MCCH in a legacy control region of the flexible subframe.

According to certain aspects, flexible subframes used as MBSFN subframes may have cell-specific reference signals present only in the first symbol of the flexible subframe. For example, a UE may receive CRS in the first symbol of a flexible subframe used as an MBSFN subframe and receive MBSFN data in other symbols of the flexible subframe.

According to certain aspects, flexible subframes used as MBSFN subframes may lack cell-specific reference signals, and a UE may detect a change to an MCCH by detecting a control channel transmitted in a different subframe than the flexible subframe used as an MBSFN subframe. For example, a UE may detect a change to an MCCH by detecting a control channel transmitted in fixed subframe 2, and receive MBSFN data in flexible subframe 3.

According to certain aspects, a UE may detect a change to an MCCH by receiving a physical downlink control channel (PDCCH) transmitted in one of the fixed subframes.

According to certain aspects, a UE may detect a change to an MCCH by receiving an enhanced physical downlink control channel (EPDCCH) transmitted in a flexible non-MBSFN subframe or a fixed subframe.

According to certain aspects, a UE may receive an indication of whether flexible subframes have reference signals transmitted in a manner corresponding to a new carrier type (NCT) or a legacy carrier type (LCT). This indication may be received by explicit signaling, or implicitly. For example, a UE may receive RRC signaling indicating that all flexible subframes will have NCT reference signals.

According to certain aspects, a UE may receive an indication that traffic adaptation involving dynamic switching of flexible subframes is enabled, and the UE may implicitly determine whether flexible subframes have NCT or LCT reference signals based on whether traffic adaptation involving dynamic switching of flexible subframes is enabled. For example, a UE may be configured to determine that subframes 3 and 4 have NCT reference signals when dynamic switching of flexible subframes is enabled, while subframes 8 and 9 have LCT reference signals when dynamic switching of flexible subframes is enabled.

Figure 8:
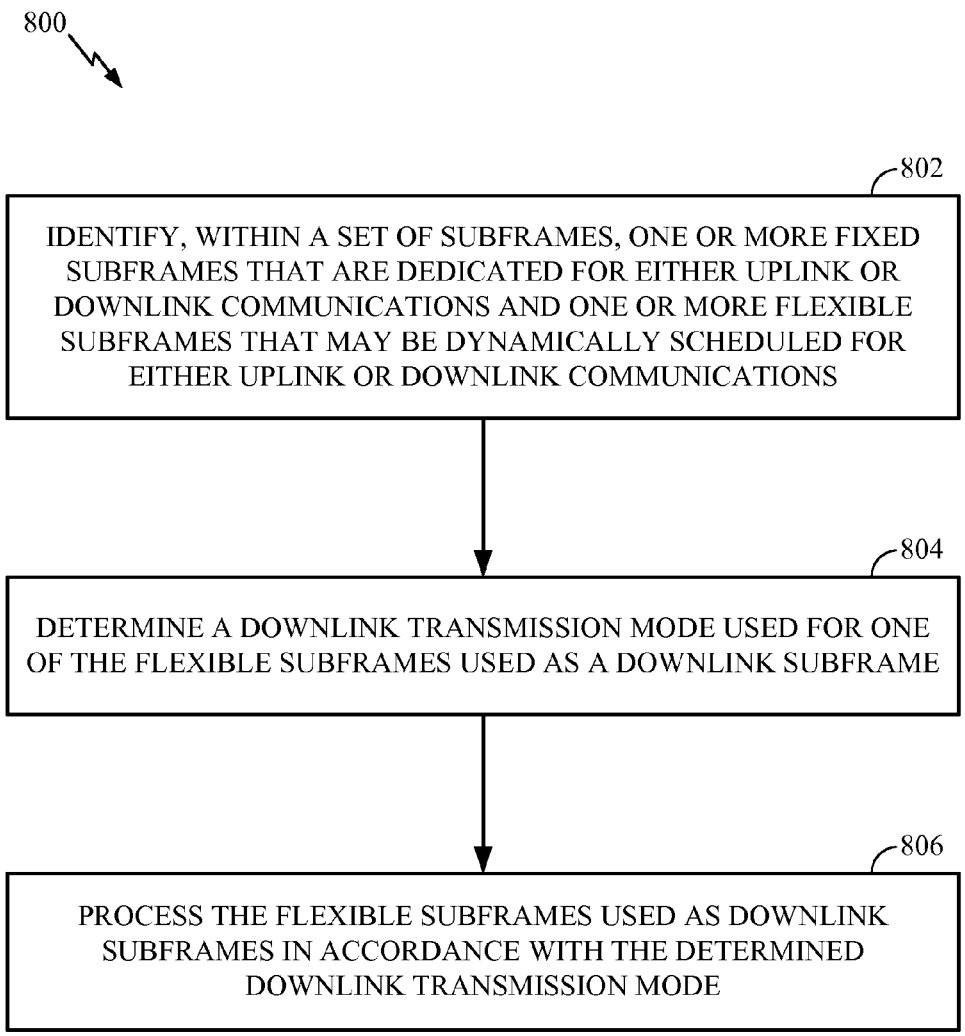
FIG. 8 illustrates example operations for wireless communications that may be performed by a User Equipment (UE), in accordance with certain aspects of the present disclosure.

FIG. 8 illustrates example operations 800 that may be performed by a User Equipment (UE) for receiving DL transmissions scheduled on flexible subframes, in accordance with certain aspects of the present disclosure. Operations 800 may begin, at 802, by identifying, within a set of subframes, one or more fixed subframes that are dedicated for either uplink or downlink communications and one or more flexible subframes that may be dynamically scheduled for either uplink or downlink communications. At 804, the UE may determine a downlink transmission mode used for one of the flexible subframes used as a downlink subframe. At 806, the UE may process the flexible subframes used as downlink subframes in accordance with the determined downlink transmission mode.

According to certain aspects, a UE may determine that one or more downlink transmission modes may be allowed for fixed subframes and one or more other downlink transmission modes may be allowed for flexible subframes. For example, a UE may determine from RRC signaling that only transmission modes 1-7 are allowed for fixed subframes, transmission modes 8-10 are allowed for flexible subframes.

According to certain aspects, a UE may determine that downlink transmission modes allowed for fixed subframes may be based on cell-specific reference signals and downlink transmission modes allowed for flexible subframes may be based on demodulation reference signals.

According to certain aspects, a UE may determine that downlink transmission modes based on cell-specific reference signals may not be allowed in a frame as long as there is at least one flexible subframe. For example, a UE may determine based on RRC signaling that cell-specific reference signals are not allowed in a frame if there is a flexible subframe in the frame.

According to certain aspects, a UE may determine that flexible subframes have cell-specific reference signals present only in a first symbol of the flexible subframe.

According to certain aspects, a UE may determine that one of the flexible subframes is a special subframe with a collision between one or more synchronization signals and demodulation reference signals. A UE may process the special subframe based on a downlink transmission mode based on cell-specific reference signals. For example, a UE may determine that subframe 1 is a special subframe in a small bandwidth system, may determine that DM-RS collides with PSS or SSS in subframe 1, and may process the subframe using a DL transmission mode based on cell-specific reference signals.

According to certain aspects, a UE may determine that one of the flexible subframes is a special subframe with demodulation reference signals punctured by one or more synchronization signals, and process the special subframe based on a downlink transmission mode based on the demodulation reference signals. For example, a UE may determine that subframe 1 is a special subframe in a small bandwidth system, may determine that some DM-RS have been punctured by PSS or SSS in subframe 1, and may process the subframe using a DL transmission mode based on DM-RS which were not punctured by PSS or SSS.

According to certain aspects, a UE may receive an indication of whether flexible subframes have reference signals transmitted in a manner corresponding to a new carrier type (NCT) or a legacy carrier type (LCT). For example, a UE may receive RRC signaling indicating that flexible subframes 3 and 4 have NCT reference signals and flexible subframes 8 and 9 have LCT reference signals.

According to certain aspects, a UE may receive an indication that traffic adaptation involving dynamic switching of flexible subframes is enabled. Dynamic switching of flexible subframes may implicitly indicate whether flexible subframes have reference signals transmitted in a manner corresponding to a new carrier type (NCT) or a legacy carrier type (LCT). For example, a UE may receive RRC signaling indicating dynamic switching of flexible subframes is enabled. The UE may be preconfigured to treat flexible subframes as having been transmitted with NCT reference signals when dynamic switching of flexible subframes is enabled.

Figure 9:
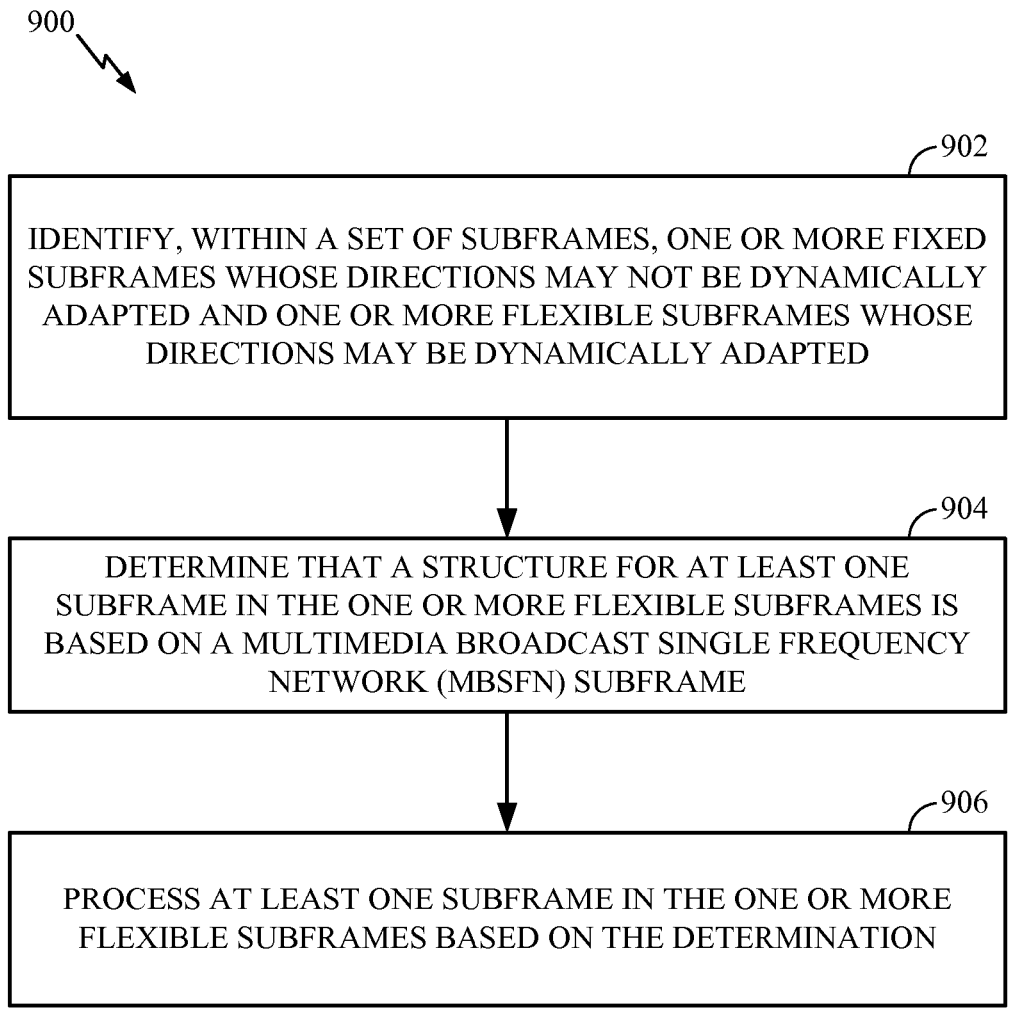
FIG. 9 illustrates example for wireless communications operations that may be performed by a User Equipment (UE), in accordance with certain aspects of the present disclosure.

FIG. 9 illustrates example operations 900 that may be performed by a User Equipment (UE) for receiving MBSFN and special subframes scheduled on flexible subframes, in accordance with certain aspects of the present disclosure. Operations 900 may begin, at 902, by identifying, within a set of subframes, one or more fixed subframes whose directions may not be dynamically adapted and one or more flexible subframes whose directions may be dynamically adapted. At 904, the UE may determine that a structure for at least one subframe in the one or more flexible subframes is based on a Multimedia Broadcast Single Frequency Network (MBSFN) subframe. At 906, the UE may process at least one subframe in the one or more flexible subframes based on the determination.

According to certain aspects, the dynamic adaptation of subframe directions may include changing a subframe direction chosen from one of a downlink subframe, an uplink subframe, or a special subframe, to a different subframe direction chosen from one of a downlink subframe, an uplink subframe, or a special subframe.

According to certain aspects, the identifying of the one or more fixed subframes and the one or more dynamic subframes may be based at least on one of a broadcast signaling and a UE-specific signaling.

According to certain aspects, the determination of the structure may be based on a signaling specific to the UE.

According to certain aspects, the MBSFN subframe may comprise a legacy control region carrying at least a cell-specific reference signal (CRS), and a non-control region not carrying the CRS.

According to certain aspects, a UE may determine a downlink transmission mode which utilizes a UE-specific demodulation reference signal (DM-RS) for downlink transmissions. The UE may receive one or more DL transmissions using the determined DL transmission mode.

According to certain aspects, a UE may determine a starting symbol in the at least one subframe in the one or more flexible subframes for at least one of a physical downlink shared channel (PDSCH) or an enhanced physical downlink control channel (EPDCCH).

According to certain aspects, the one or more flexible subframes may comprise at least two different subframe types, wherein one subframe type has a cell-specific reference signal (CRS) as in the one or more flexible subframes and the other subframe type has reduced CRS or no CRS.

According to certain aspects, a UE may identify the a flexible subframe as a Multimedia Broadcast Single Frequency Network (MBSFN) subframe or a special subframe, and another subframe as one or more other types of subframes.

According to certain aspects, a UE may determine that cell-specific reference signals are present only in the first symbol of a Multimedia Broadcast Single Frequency Network (MBSFN) subframe. For example, a UE may determine that the first symbol of a MBSFN subframe has cell-specific reference signals, and may interpret all other symbols of the MBSFN subframe as conveying MBSFN data.

According to certain aspects, a UE may determine that a flexible subframe is a special subframe, and cell-specific reference signals are in one or more symbols of the special subframe. For example, a UE may determine that flexible subframe 1 is a special subframe, and that cell-specific reference signals are in symbols 3 and 4 of the special subframe.

According to certain aspects, a UE may determine a starting symbol for at least one of a physical downlink shared channel (PDSCH) or an enhanced physical downlink control channel (EPDCCH). For example, a UE may receive DL transmission in a flexible subframe and determine that an EPDCCH starts in symbol 0 of the subframe.

According to certain aspects, a UE may determine the starting symbol of a physical downlink shared channel (PDSCH) or an enhanced physical downlink control channel (EPDCCH) may be in the first symbol in the first subframe.

According to certain aspects, a UE may determine the starting symbol of a physical downlink shared channel (PDSCH) or an enhanced physical downlink control channel (EPDCCH) may be no earlier than the second symbol in the second subframe. For example, a UE may determine that second subframe has legacy control channels and CRS in symbol 0, and a PDSCH in the subframe is no earlier than symbol 1.

According to certain aspects, a UE may determine absence of legacy control channels or signals in a first subframe, and presence of legacy control channels or signals in a second subframe.

According to certain aspects, a UE may determine a first subframe contains a physical control format indication channel (PCFICH), a physical hybrid ARQ indicator channel (PHICH), or a physical downlink control channel (PDCCH).

Figure 10:
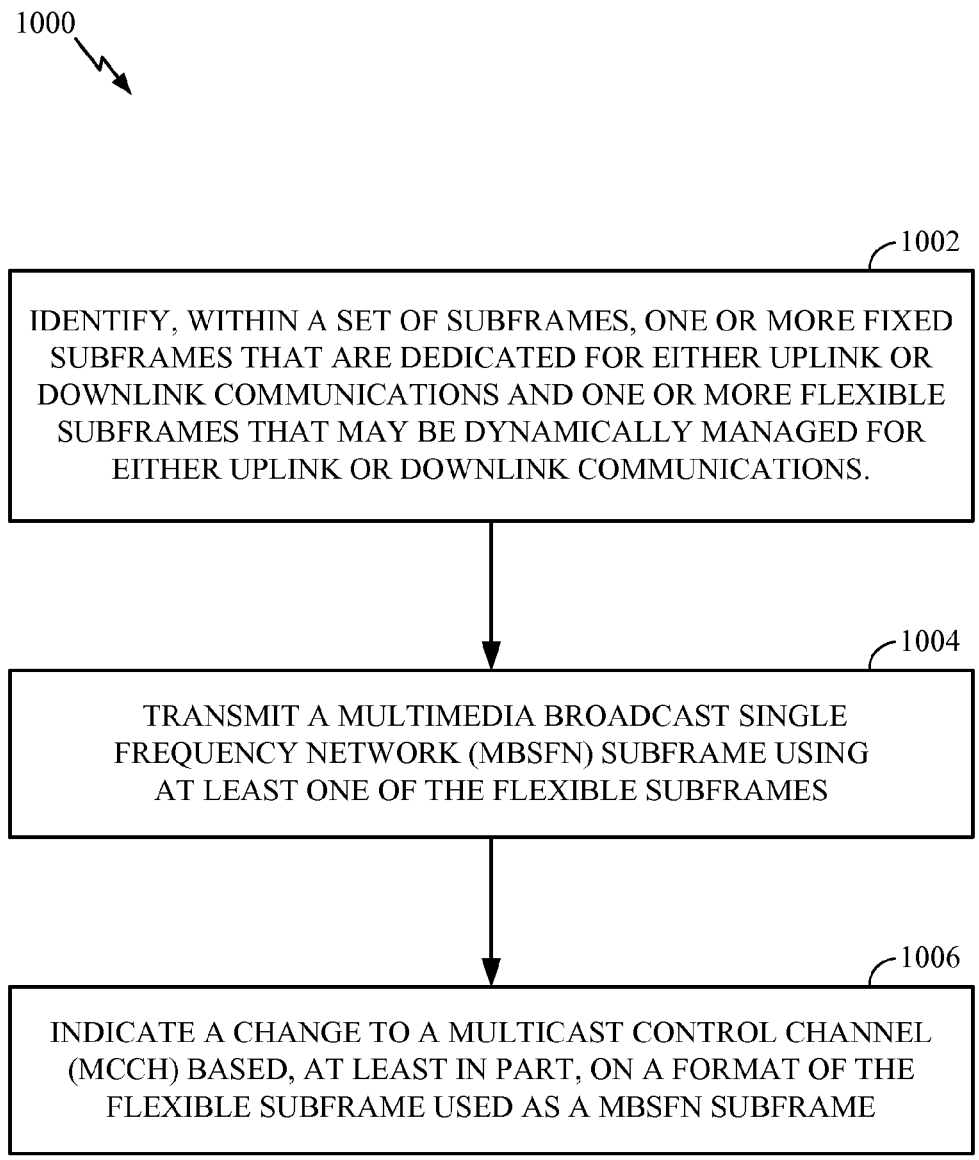
FIG. 10 illustrates example operations for wireless communications that may be performed by a Base Station (BS), in accordance with certain aspects of the present disclosure.
Figure 11:
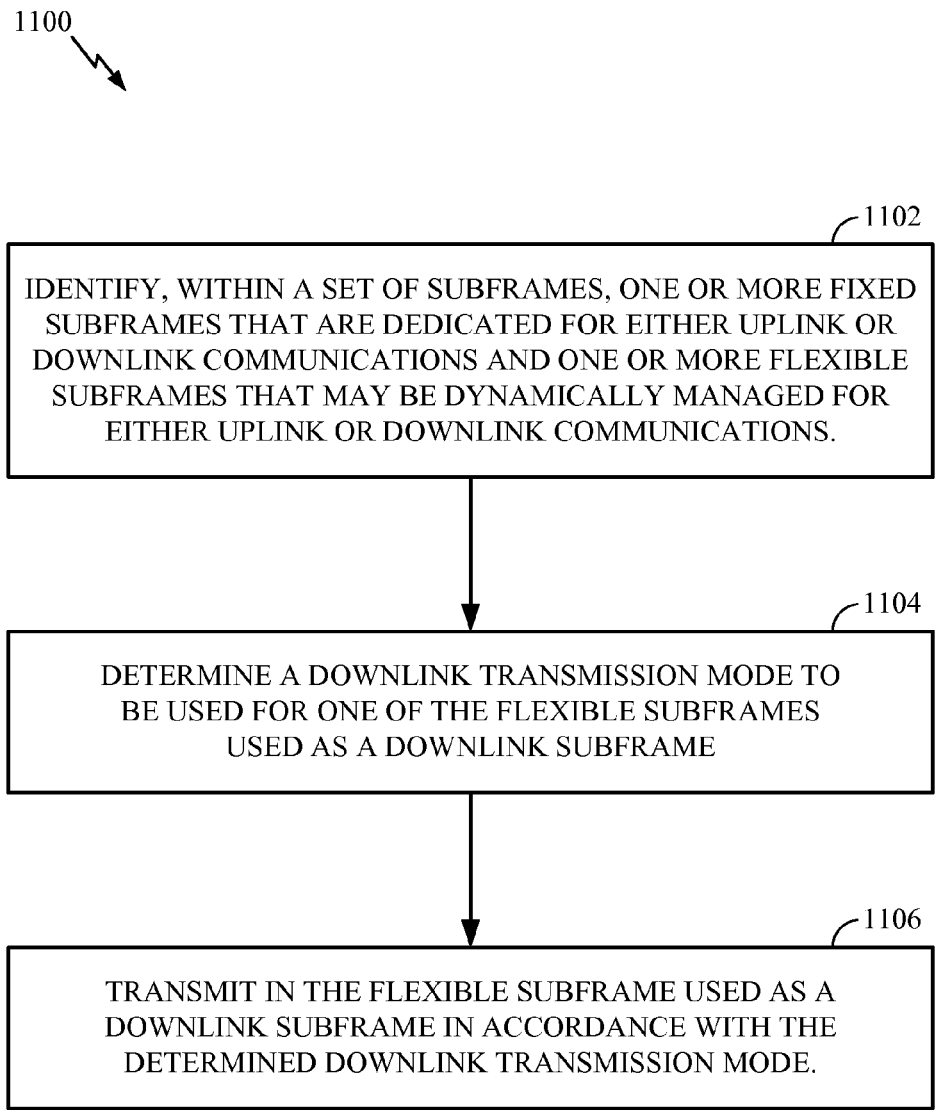
FIG. 11 illustrates example operations for wireless communications that may be performed by a Base Station (BS), in accordance with certain aspects of the present disclosure.
Figure 12:
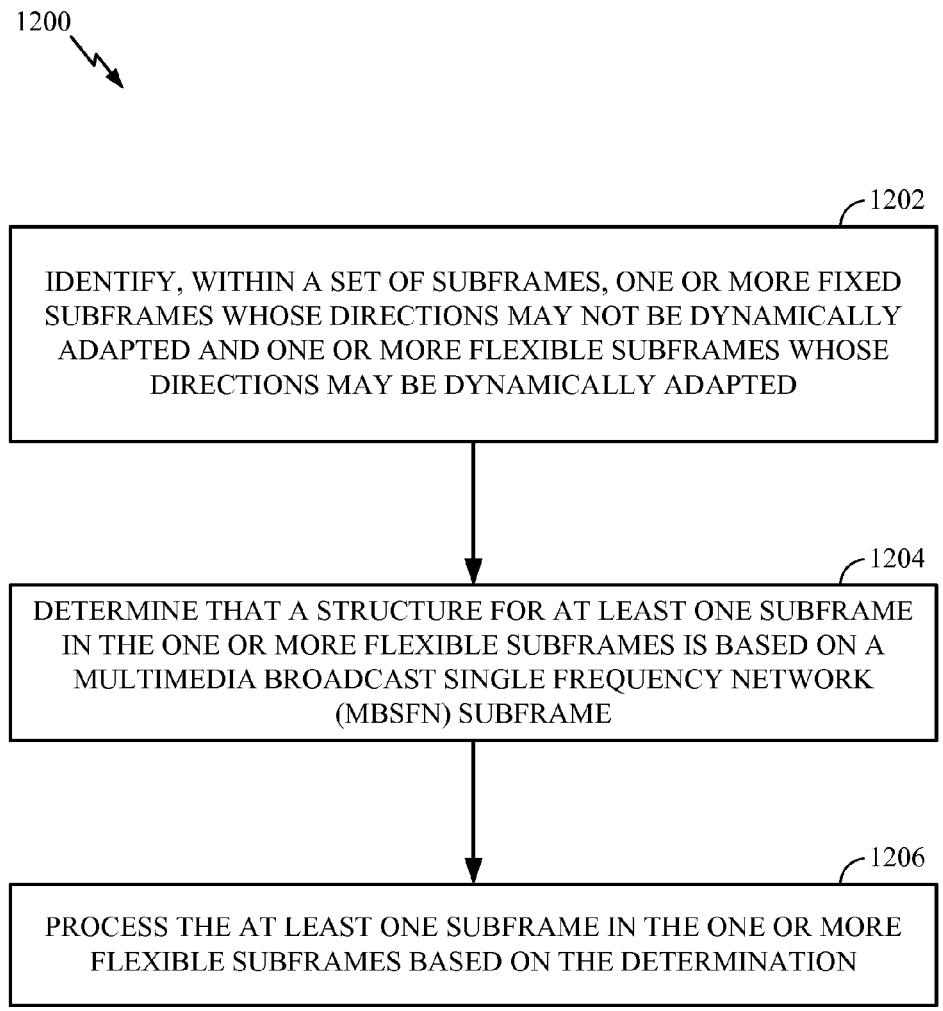
FIG. 12 illustrates example operations for wireless communications that may be performed by a Base Station (BS), in accordance with certain aspects of the present disclosure.

FIGS. 10-12 describe operations that may be performed by a Base Station (BS) which are complementary to the operations performed by a User Equipment (UE) in FIGS. 7-9 respectively.

FIG. 10 illustrates example operations 1000 that may be performed by a Base Station (BS) for transmitting MCCH changes scheduled on flexible subframes, in accordance with certain aspects of the present disclosure. Operations 1000 may begin, at 1002, with the BS identifying, within a set of subframes, one or more fixed subframes that are dedicated for either uplink or downlink communications and one or more flexible subframes that may be dynamically managed for either uplink or downlink communications. At 1004, the BS may transmit a Multimedia Broadcast Single Frequency Network (MBSFN) subframe using at least one of the flexible subframes. At 1006, the BS may indicate a change to a Multicast Control Channel (MCCH) based, at least in part, on a format of the flexible subframe used as a MBSFN subframe.

FIG. 11 illustrates example operations 1100 that may be performed by a Base Station (BS) for transmitting DL transmissions scheduled on flexible subframes, in accordance with certain aspects of the present disclosure. Operations 1100 may begin, at 1102, with the BS identifying, within a set of subframes, one or more fixed subframes that are dedicated for either uplink or downlink communications and one or more flexible subframes that may be dynamically managed for either uplink or downlink communications. At 1104, the BS may determine a downlink transmission mode to be used for one of the flexible subframes used as a downlink subframe. At 1106, the BS may transmit in the flexible subframe used as a downlink subframe in accordance with the determined downlink transmission mode.

FIG. 12 illustrates example operations 1200 that may be performed by a Base Station (BS) for transmitting MBSFN and special subframes scheduled on flexible subframes, in accordance with certain aspects of the present disclosure. Operations 1200 may begin, at 1202, with the BS identifying, within a set of subframes, one or more fixed subframes whose directions may not be dynamically adapted and one or more flexible subframes whose directions may be dynamically adapted. At 1204, the BS may determine that a structure for at least one subframe in the one or more flexible subframes is based on a Multimedia Broadcast Single Frequency Network (MBSFN) subframe. At 1206, the BS may process the at least one subframe in the one or more flexible subframes based on the determination.

According to certain aspects, the dynamic adaptation of subframe directions may include changing a subframe direction chosen from one of a downlink subframe, an uplink subframe, or a special subframe, to a different subframe direction chosen from one of a downlink subframe, an uplink subframe, or a special subframe.

According to certain aspects, a BS may transmit signaling identifying one or more fixed subframes and one or more dynamic subframes within a set of subframes.

According to certain aspects, a BS may transmit UE-specific signaling indicating that the structure for at least one subframe in the one or flexible subframes is based on a MBSFN subframe.

According to certain aspects, the MBSFN subframe may comprise a legacy control region carrying at least a cell-specific reference signal (CRS), and a non-control region not carrying the CRS.

According to certain aspects, a BS may determine a downlink transmission mode which utilizes a UE-specific demodulation reference signal (DM-RS) for downlink transmissions.

According to certain aspects, a BS may determine a starting symbol in the at least one subframe in the one or more flexible subframes for at least one of a physical downlink shared channel (PDSCH) or an enhanced physical downlink control channel (EPDCCH).

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    identifying, within a set of subframes, one or more fixed subframes whose directions are not able to be dynamically adapted and one or more flexible subframes whose directions are able to be dynamically adapted;
    determining a downlink transmission scheme based on a signaling specific to the UE that comprises an indication of which downlink transmission scheme is used for one of the flexible subframes used as a downlink subframe, wherein:
        a first type of one or more downlink transmission schemes is allowed for the fixed subframes and not allowed for the flexible subframes, wherein the first type comprises one or more downlink transmission schemes in which downlink transmissions are based on cell-specific reference signals, and
        a second type of one or more downlink transmission schemes is allowed for the fixed subframes and the flexible subframes, wherein the second type comprises one or more downlink transmission schemes in which downlink transmissions are based on demodulation reference signals; and
    processing the flexible subframe used as the downlink subframe in accordance with the determined downlink transmission scheme, wherein the processing comprises receiving a primary synchronization signal (PSS) or a secondary synchronization signal (SSS) that punctures a demodulation reference signal in the flexible subframe.

2. The method of claim 1, wherein the dynamic adaptation of subframe directions includes changing a subframe direction chosen from one of a downlink subframe or an uplink subframe to a different subframe direction chosen from one of a downlink subframe or an uplink subframe.

3. The method of claim 1, wherein the identifying of the one or more fixed subframes and the one or more flexible subframes is based at least on one of a broadcast signaling and a UE-specific signaling.

4. The method of claim 1, further comprising determining the downlink transmission scheme utilizes a UE-specific demodulation reference signal (DM-RS) for downlink transmissions.

5. The method of claim 1, further comprising determining a starting symbol in the flexible subframe used as the downlink subframe for at least one of a physical downlink shared channel (PDSCH) or an enhanced physical downlink control channel (EPDCCH).

6. The method of claim 1, wherein the one or more flexible subframes comprise at least two different subframe types, wherein one subframe type has a cell-specific reference signal (CRS) as in the one or more fixed subframes and another subframe type has reduced CRS or no CRS.

7. A method for wireless communications by a base station (BS), comprising:
    identifying, within a set of subframes, one or more fixed subframes whose directions are not able to be dynamically adapted and one or more flexible subframes whose directions are able to be dynamically adapted;
    determining a downlink transmission scheme to use for one of the flexible subframes used as a downlink subframe, wherein:
        a first type of one or more downlink transmission schemes is allowed for the fixed subframes and not allowed for the flexible subframes, wherein the first type comprises one or more downlink transmission schemes in which downlink transmissions are based on cell-specific reference signals, and
        a second type of one or more downlink transmission schemes is allowed for the fixed subframes and the flexible subframes, wherein the second type comprises one or more downlink transmission schemes in which downlink transmissions are based on demodulation reference signals;
    transmitting UE-specific signaling that comprises an indication of which determined downlink transmission scheme is used for the flexible subframe used as the downlink subframe; and
    processing the flexible subframe used as the downlink subframe in accordance with the determined downlink transmission scheme, wherein the processing comprises transmitting a primary synchronization signal (PSS) or a secondary synchronization signal (SSS) that punctures a demodulation reference signal in the flexible subframe.

8. The method of claim 7, wherein the dynamic adaptation of subframe directions includes changing a subframe direction chosen from one of a downlink subframe or an uplink subframe to a different subframe direction chosen from one of a downlink subframe or an uplink subframe.

9. The method of claim 7, further comprising:
    transmitting signaling identifying the one or more fixed subframes and the one or more flexible subframes within the set of subframes.

10. The method of claim 7, further comprising:
    transmitting UE-specific signaling indicating that a structure for the flexible subframe used as the downlink subframe is based on a Multimedia Broadcast Single Frequency Network (MBSFN) subframe structure.

11. The method of claim 7, further comprising determining the downlink transmission scheme utilizes a UE-specific demodulation reference signal (DM-RS) for downlink transmissions.

12. The method of claim 7, further comprising determining a starting symbol in the flexible subframe used as the downlink subframe for at least one of a physical downlink shared channel (PDSCH) or an enhanced physical downlink control channel (EPDCCH).

13. An apparatus for wireless communications, comprising:
    a processor configured to:
        identify, within a set of subframes, one or more fixed subframes whose directions are not able to be dynamically adapted and one or more flexible subframes whose directions are able to be dynamically adapted;
        determine a downlink transmission scheme based on a signaling specific to a user equipment (UE) comprising the apparatus that comprises an indication of which downlink transmission scheme is used for one of the flexible subframes used as a downlink subframe, wherein:
            a first type of one or more downlink transmission schemes is allowed for the fixed subframes and not allowed for the flexible subframes, wherein the first type comprises one or more downlink transmission schemes in which downlink transmissions are based on cell-specific reference signals, and
a second type of one or more downlink transmission schemes is allowed for the fixed subframes and the flexible subframes, wherein the second type comprises one or more downlink transmission schemes in which downlink transmissions are based on demodulation reference signals; and
process the flexible subframe used as the downlink subframe in accordance with the determined downlink transmission scheme, wherein the processing comprises receiving a primary synchronization signal (PSS) or a secondary synchronization signal (SSS) that punctures a demodulation reference signal in the flexible subframe; and
a memory coupled with the processor.

14. The apparatus of claim 13, wherein the dynamic adaptation of subframe directions includes changing a subframe direction chosen from one of a downlink subframe or an uplink subframe to a different subframe direction chosen from one of a downlink subframe or an uplink subframe.

15. The apparatus of claim 13, wherein the identifying of the one or more fixed subframes and the one or more flexible subframes is based at least on one of a broadcast signaling and a user equipment-specific signaling.

16. The apparatus of claim 13, wherein the processor is further configured to determine the downlink transmission scheme utilizes a user equipment-specific demodulation reference signal (DM-RS) for downlink transmissions.

17. The apparatus of claim 13, wherein the processor is further configured to determine a starting symbol in the flexible subframe used as the downlink subframe for at least one of a physical downlink shared channel (PDSCH) or an enhanced physical downlink control channel (EPDCCH).

18. The apparatus of claim 13, wherein the one or more flexible subframes comprises at least two different subframe types, where one subframe type has a cell-specific reference signal (CRS) as in the one or more fixed subframes and another subframe type has reduced CRS or no CRS.

19. An apparatus for wireless communications, comprising:
a processor configured to:
identify, within a set of subframes, one or more fixed subframes whose directions are not able to be dynamically adapted and one or more flexible subframes that are able to be dynamically managed for either uplink or downlink communications;
determine a downlink transmission scheme to use for one of the flexible subframes used as a downlink subframe, wherein:
a first type of one or more downlink transmission schemes is allowed for the fixed subframes and not allowed for the flexible subframes, wherein the first type comprises one or more downlink transmission schemes in which downlink transmissions are based on cell-specific reference signals, and
a second type of one or more downlink transmission schemes is allowed for the fixed subframes and the flexible subframes, wherein the second type comprises one or more downlink transmission schemes in which downlink transmissions are based on demodulation reference signals;
transmit UE-specific signaling that comprises an indication of which determined downlink transmission scheme is used for the flexible subframe used as the downlink subframe; and
process the flexible subframe used as the downlink subframe in accordance with the determined downlink transmission scheme, wherein the processing comprises transmitting a primary synchronization signal (PSS) or a secondary synchronization signal (SSS) that punctures a demodulation reference signal in the flexible subframe; and
a memory coupled with the processor.

20. The apparatus of claim 19, wherein the dynamic adaptation of subframe directions includes changing a subframe direction chosen from one of a downlink subframe or an uplink subframe to a different subframe direction chosen from one of a downlink subframe or an uplink subframe.

21. The apparatus of claim 19, wherein the processor is further configured to transmit signaling identifying the one or more fixed subframes and the one or more flexible subframes within the set of subframes.

22. The apparatus of claim 19, wherein the processor is further configured to transmit UE-specific signaling indicating that a structure for the flexible subframe used as the downlink subframe is based on a Multimedia Broadcast Single Frequency Network (MBSFN) subframe structure.

23. The apparatus of claim 19, wherein the processor is further configured to determine the downlink transmission scheme utilizes a UE-specific demodulation reference signal (DM-RS) for downlink transmissions.

24. The apparatus of claim 19, wherein the processor is further configured to determine a starting symbol in the flexible subframe used as the downlink subframe for at least one of a physical downlink shared channel (PDSCH) or an enhanced physical downlink control channel (EPDCCH).

25. The method of claim 1, wherein the processing further comprises receiving a downlink transmission in the flexible subframe based on other demodulation reference signals that are not punctured by the PSS or the SSS.

26. The apparatus of claim 13, wherein the processing further comprises receiving a downlink transmission in the flexible subframe based on other demodulation reference signals that are not punctured by the PSS or the SSS.

* * * * *